H. J. FERRIS.
FEED AND LITTER CARRIER.
APPLICATION FILED JAN. 24, 1908.
913,881.
Patented Mar. 2, 1909.
3 SHEETS—SHEET 3.
Fig. 5.
Fig. 6.
Fig. 7.
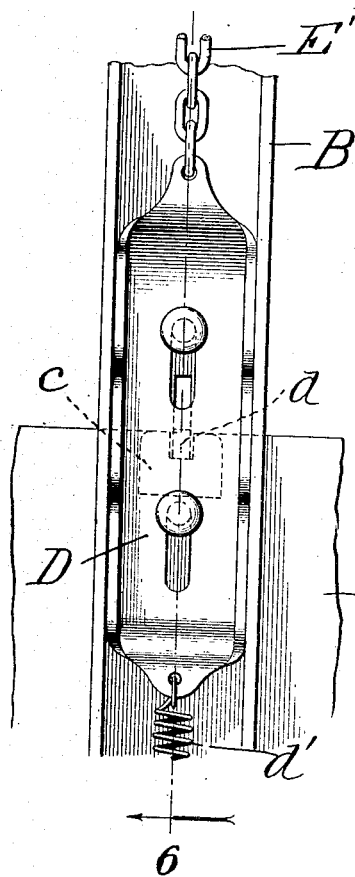
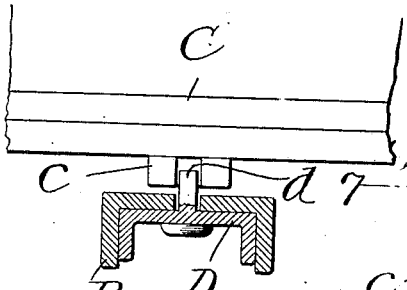
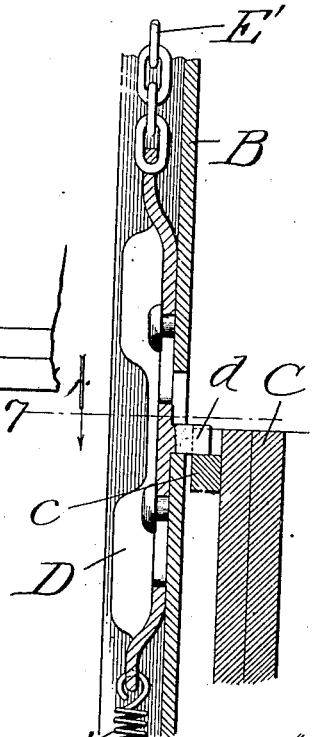
Fig. 8.
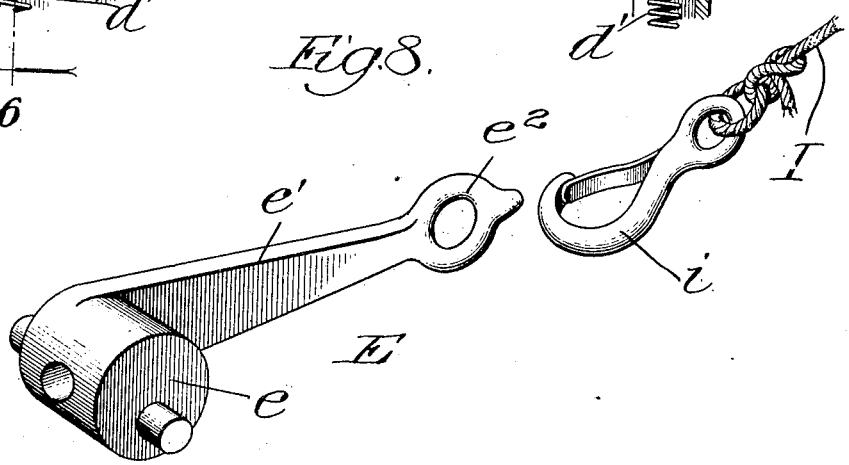
Witnesses
Chas. E. Gaylord
Clyde Palmer
Inventor
Howard J. Ferris,
By Dyrenforth, Lee, Chritton & Wiles,
Att'ys

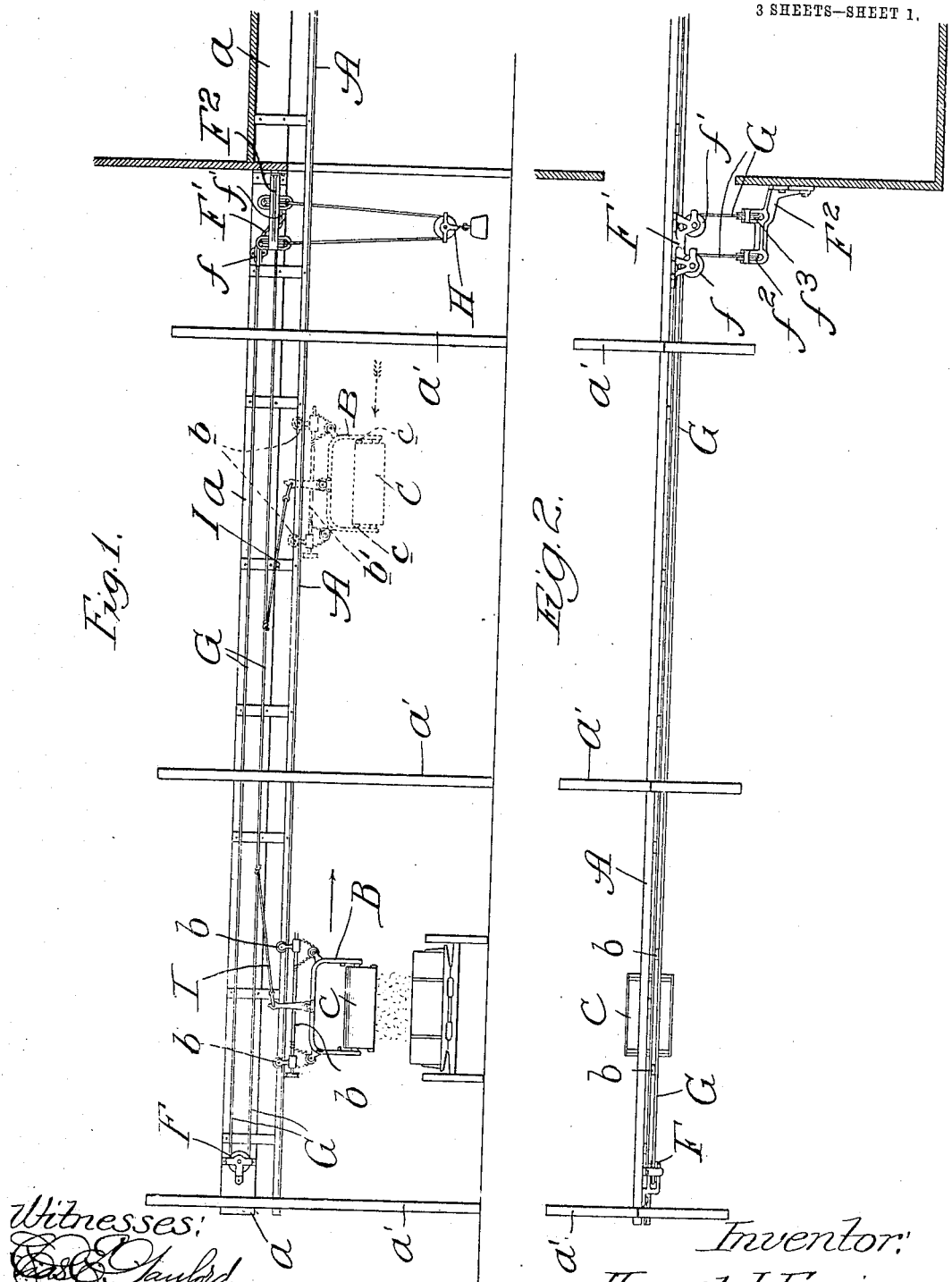

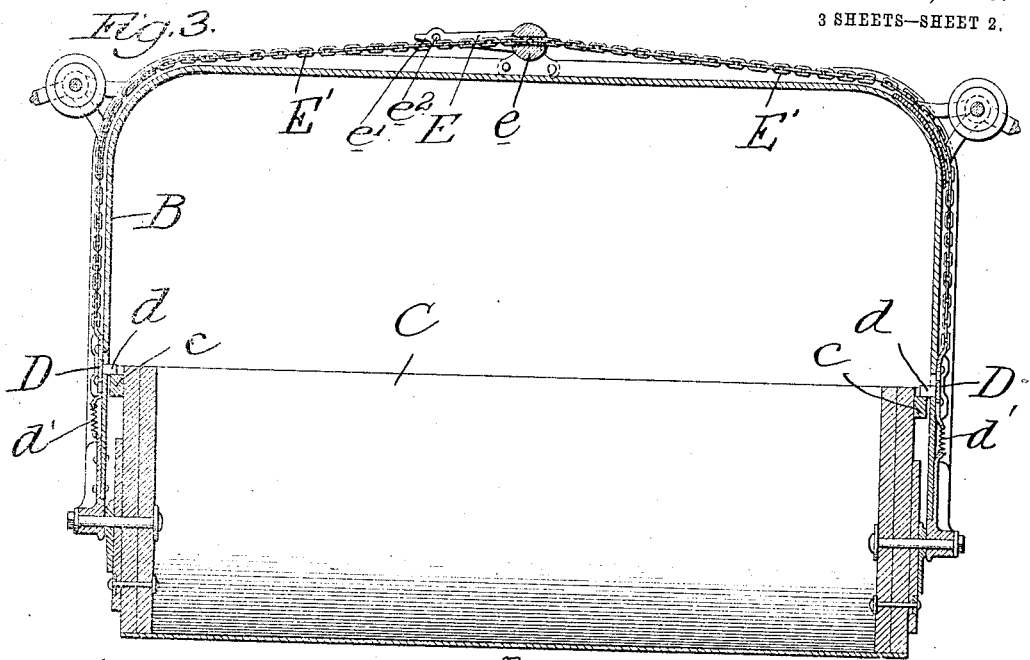
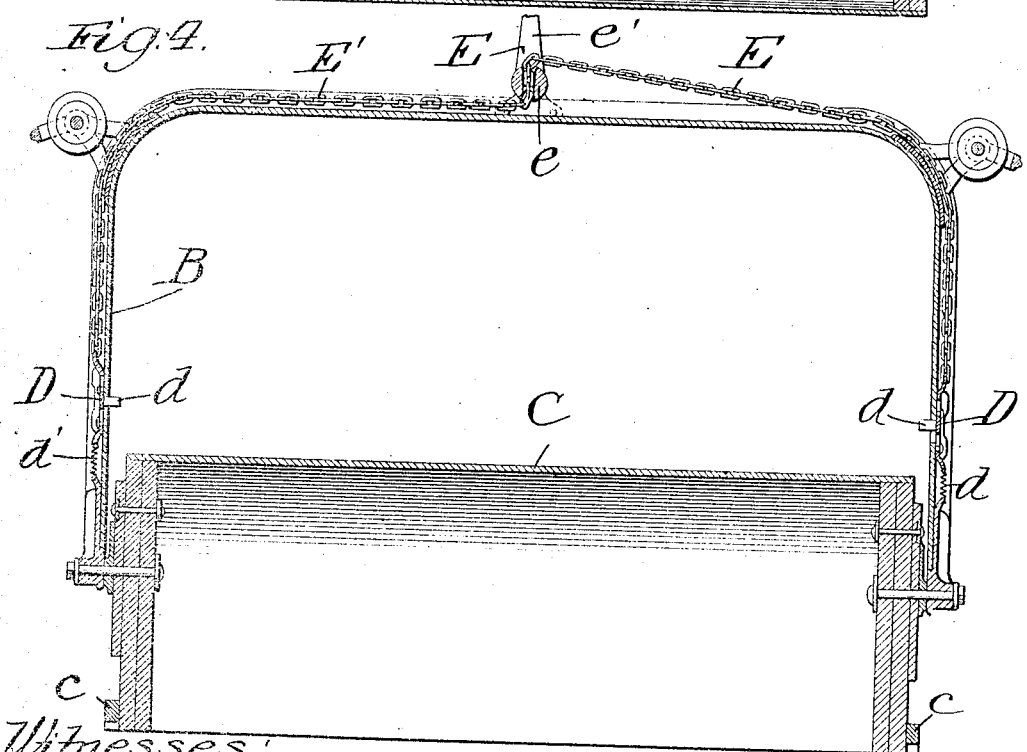

UNITED STATES PATENT OFFICE.

HOWARD J. FERRIS, OF HARVARD, ILLINOIS, ASSIGNOR TO HUNT, HELM, FERRIS & COMPANY A CORPORATION OF ILLINOIS.

FEED AND LITTER CARRIER.

No. 913,881.          Specification of Letters Patent.          Patented March 2, 1909.

Application filed January 24, 1908. Serial No. 412,386.

*To all whom it may concern:*

Be it known that I, HOWARD J. FERRIS, a citizen of the United States, residing at Harvard, in the county of McHenry and State of Illinois, have invented a new and useful Improvement in Feed and Litter Carriers, of which the following is a specification.

My invention relates to certain new and useful improvements in feed and litter carriers, and is fully described and explained in the specification and shown in the accompanying drawings, in which:

Figure 1 is an elevation of my improved device showing the same in use; Fig. 2 is the top plan of the parts shown in Fig. 1; Fig. 3 is a central longitudinal section through the tub showing the same locked in an upright position; Fig. 4 is a similar section showing the tub dumped; Fig. 5 is an elevation of the tub locking-device; Fig. 6 is a vertical section on the line 6 of Fig. 5; Fig. 7 is a horizontal section on the line 7 of Fig. 6; and Fig. 8 is a perspective view showing the tripping-member and tripping rope.

Referring to the drawings, A is the track extending within the barn as shown at the right of Fig. 1, and running from the barn door outward to the point where the litter is to be dumped, the same being hung from a horizontal stringer supported by posts of the common form in use where a stiff track is used for a like purpose. In the drawings the horizontal stringer to which the track is secured is represented by $a$ while the posts are represented by $a^1$. Upon the track A run hangers $b$ supporting between them a rotatable shaft $b^1$ by which an inverted U-shaped frame B can be raised and lowered. The frame B is in its preferred form of construction made of outwardly facing channel-iron as shown in Figs. 3 and 4 and supports pivotally between its ends in unstable equilibrium, a tub C in which the material to be carried is placed. The tub C is provided at its ends and near the upper edges thereof with notched lugs $c$ which are adapted to be engaged by pins $d$ on locking-members D guided in the channels of the frame B so as to be capable of vertical movement therein the pins $d$ projecting through slots provided for the purpose in said frame B. The locking members D are normally held in a lower or locking position by means of springs $d^1$. Upon the upper or horizontal portion of the frame B is journaled a tripping-member E comprising a horizontal and transversely extending perforated rock-shaft $e$ and a radially projecting arm $e^1$ having at its end an eye $e^2$. The two locking-members D are connected by a chain $E^1$ of such length as to be taut when the locking-members are both in their lower position and the chain is run through the central perforation of the rock-shaft $e$ as illustrated. By this construction it is possible by rotating the rock-shaft $e$ to shorten the effective length of the chain $E^1$ as illustrated in Fig. 4, so as to draw up the locking-members so that their pins are disengaged from the lugs upon the tub or container, thereby permitting the container to fall over into an inverted position by reason of its unstable equilibrium. Upon the return of the rock-shaft to its original position, the locking-members will be returned so as to be in position to lock the container or tub when returned to its upright position. It will also be evident that the arm $e^1$ of the tripping-member E can be utilized as means for drawing the carrier to the right as viewed in Figs. 3 and 4 without any tendency to dump the tub or container, while if the pull exerted upon the member E be in the opposite direction the member will be partially rotated so as to shorten the effective length of the chain $E^1$ and dump the container as hereinbefore set forth.

Near the outer end of the stringer or beam $a$ is mounted a sheave F rotatable upon a horizontal axis at right-angles to the beam. A bracket $F^1$ is mounted upon the beam just outside the barn door and this bracket carries two sheaves $f$, $f^1$, and are offset with respect to each other both in horizontal and vertical planes and run upon vertical axes as illustrated. Projecting from the wall of the barn to one side of the doorway is a bracket $F^2$ carrying two sheaves $f^2$, $f^3$ running upon horizontal axes which are parallel to the track A. An endless rope G runs over the sheave F and it extends backwards towards the barn in two parallel lengths. The upper length of this rope runs over the sheave $f$ which is the higher of the two sheaves carried by the bracket $F^1$, thence over the sheave $f^2$ which is the outer of the two sheaves carried by the bracket $F^2$ and thence downwards where it joins the lower strand or length of rope G. The lower strand likewise runs over the sheave $f^1$ which is the lower and backward sheave carried by the bracket F¹, thence over the sheave f³ and thence downward where it joins the opposite end of the rope G. The bight of rope between the sheaves f² and f³ hangs downward as shown in Fig. 1, and the entire rope is held taut by means of a weighted idler H hanging in said bight. The cable or rope G has secured to it a pulling and tripping-rope I provided at its end with a snap-hook $i$ which is adapted to engage with the eye $e^2$ at the end of the arm $e^1$ of the tripping-member E.

In Fig. 1 of the drawing and on the right thereof is shown, in dotted lines, the loaded carrier traveling outward from the barn to the point where it is desired to dump such load, and on the left of said figure is shown, in full lines, the carrier and its connecting parts after its load has been dumped by the pull of the cable on its return traverse.

The device is operated in the following manner: The tub or container, in its upright position, is loaded within the barn with the material to be dumped. It is then run out by hand until past the barn-door whereupon the rope I is engaged with the eye at the end of the tripping-member whereby connection is brought about between the rope or cable G and the carrier. Thereupon the bight of the rope or cable G is drawn by hand in such a way as to cause the rope I to move outward drawing the carrier after it until the dumping point is reached. With the ropes run in the manner here shown the left-hand strand of the bight is drawn downward as shown in Fig. 1 to produce this result. When the litter-pile or wagon into which the material is to be dumped is reached the direction of movement of the rope or cable G is reversed, upon which the rope I causes rotation of the tripping-member E and consequent releasing of the container or tub to dump the contents thereof. Continued pull in this direction returns the carrier to the barn door where it can be unlatched and wheeled into the barn for further use.

In the commercial manufacture of feed and litter carriers, two common practices have prevailed; under the first of which comparatively light and flexible track of rope or light bar-iron is used, while under the second practice a stiff track like that shown in the drawings has been preferred. The light and flexible track has practical difficulties and disadvantages which limit its use to barns in which there are but few curves or switches, but it has the great advantage that it can be provided with an automatic device for causing the dumping of the container at a predetermined point and that when the container is dumped, the track itself is sufficiently springy to cause the container to rise suddenly when relieved of the weight of its contents so that it will return automatically to the barn. Where complicated installations in the barn are required, however, and wherever other conditions make the stiff track desirable, the inability to cause the automatic return of the carrier to the barn has been detrimental to the commercial success of the carrier. This matter is particularly important because in a great many instances the litter-pile is located on the opposite side of the barn-yard from the barn and in bad weather the barn-yard may be and frequently is extremely muddy, dirty and disagreeable. In cases where it is necessary for the user to walk after the carrier and bring it back by hand, its advantages over an ordinary wheelbarrow are under these conditions problematical. With my construction, however, the entire movement of the carrier to the end of the track, its dumping and its returning can be accomplished by manipulation from a point adjacent to the barn-door which will in practice be located upon the wooden runway or platform which commonly runs downward at an incline from the barn-door. Furthermore the point of dumping of the material can be varied at will without the usual traveling into the barnyard to change the position of an automatic tripping-device and the point of release of the load is exactly the point desired in all cases. These results are accomplished by using a stiff track having all the advantages and convenience of strength and ease of installation, particularly in complicated installations, which are present when it is required to bring the carrier back to the barn by hand.

In the form of construction herein illustrated the operating bight of the rope is shown as outside the barn-door. In many cases it may be convenient to lead the rope inside the barn so that it can be handled without the operator going out of doors. This construction will have advantages in inclement weather and can readily be adopted when desired. Inasmuch as the change necessary to illustrate such a construction has no bearing on the construction of the parts embodied in my invention, but affect wholly the construction of the barn itself, I have not deemed it necessary to illustrate such modification. It will be understood, however, by any mechanic that such modification can be made in a number of obvious ways, and when I speak of the operating means for the carrier being located adjacent to the building in the specification and in the following claims, it will be understood that I used this expression with the intent that it shall cover the construction if the operating rope be run inside the building and controllable from that point.

I realize that considerable variation is possible in the details of construction of my improved device, without departing from the spirit of my invention, and I do not intend, therefore, to limit myself to the specific form herein shown and described.

What I claim as new, and desire to secure by Letters Patent, is—

1. The combination with a track extended from a point within to a point distant from the building from which the litter is to be taken, of a carrier running upon the track and adapted to be dumped, a single cable for propelling the carrier upon the track, and means whereby manipulation of said cable will dump the carrier.

2. The combination with a rigid track extending from a point within to a point distant from the building from which the litter is to be taken, of a carrier running upon the track and capable of being dumped, and means controllable from a point adjacent to the building for propelling the carrier to the dumping point, causing the dumping thereof and for returning the carrier to the building.

3. The combination with a track extending from a point within the building from which litter is to be taken to a point distant therefrom and a carrier capable of being dumped running upon said track, of a cable having means of connection with the carrier and controllable from a point adjacent to the building and adapted by its movement to draw the carrier to the dumping point and return the same and means constructed and arranged to cause the automatic dumping of the carrier by the return movement of the cable.

4. The combination with a track extending from a point within to a point distant from the building from which litter is to be taken, and a carrier capable of being dumped running upon the track, of a cable above the track and having means of connection with the carrier, the cable being adapted to be operated from a point adjacent to the building and means constructed and arranged to cause the automatic dumping of the carrier by the return movement of the cable.

5. The combination with a track extending from a point within to a point distant from the building from which litter is to be taken and a carrier capable of being dumped running upon the track, of a cable above the track outside the building and turned laterally away from the track and bent downward to a point where it can be manipulated whereby passage is given beneath the lateral extension of the cable for the passage of the carrier and means whereby the movement of the cable will draw, return and dump the carrier.

6. The combination with a carrier-frame of tripping members on opposite sides thereof, a rock-shaft, flexible means of connection between the tripping and the locking-members extending through a perforation in the rock-shaft, whereby rotation of the rock-shaft will simultaneously move said members and a radially projecting arm connected to the rock-shaft and having means of attachment for a propelling device whereby movement of the propelling device in one direction will draw the carrier forward and movement in the opposite direction will first dump and then draw the carrier in the opposite direction.

7. The combination with a track of an endless rope supported above the track, a frame movable upon the track, a tub or container pivotally mounted in the frame, locking means on the frame for holding the tub or container in an upright position, a tripping-member pivoted to the frame and comprising a rock-shaft and a projecting arm, a flexible connector between the locking device and the rock-shaft and means for connecting the radial arm of the tripping-device to the endless cable.

8. The combination with a track of an endless cable supported above the track, a frame movable upon the track, a tub or container pivoted in unstable equilibrium in the frame, two locking-devices movable in the frame and adapted to engage the tub or container to lock the same in an upright position, a rock-shaft pivoted in the frame, flexible means of connection between the two locking-devices running through a perforation in the rock-shaft, a radial arm projecting from the rock-shaft and means for connecting the arm to the endless cable.

HOWARD J. FERRIS.

In presence of—
  E. B. HUNT,
  R. A. HEMENWAY.